(12) United States Patent
McGilvry

(10) Patent No.: US 9,474,257 B1
(45) Date of Patent: Oct. 25, 2016

(54) IMITATION CRAWDAD ARTIFICIAL FISHING LURE

(71) Applicant: Robert McGilvry, Republic, MO (US)

(72) Inventor: Robert McGilvry, Republic, MO (US)

( * ) Notice: Subject to any disclaimer, the term of this patent is extended or adjusted under 35 U.S.C. 154(b) by 64 days.

(21) Appl. No.: 14/452,028

(22) Filed: Aug. 5, 2014

Related U.S. Application Data

(60) Division of application No. 13/199,048, filed on Aug. 17, 2011, which is a continuation-in-part of application No. 13/066,846, filed on Apr. 26, 2011, now abandoned.

(60) Provisional application No. 61/404,626, filed on Oct. 6, 2010, provisional application No. 61/343,290, filed on Apr. 26, 2010.

(51) Int. Cl.
| | | |
|---|---|---|
| *A01K 85/18* | (2006.01) | |
| *A01K 85/00* | (2006.01) | |
| *A01K 83/06* | (2006.01) | |
| *A01K 85/02* | (2006.01) | |

(52) U.S. Cl.
CPC ............. *A01K 85/02* (2013.01); *A01K 83/06* (2013.01); *A01K 85/00* (2013.01); *A01K 85/18* (2013.01)

(58) Field of Classification Search
CPC ....... A01K 85/00; A01K 85/18; A01K 83/06
USPC ............. 43/42.15, 42.09, 42.24, 42.3, 42.26, 43/44.2, 44.4, 44.6, 42.28, 42.4, 42.43
See application file for complete search history.

(56) References Cited

U.S. PATENT DOCUMENTS

| | | | | |
|---|---|---|---|---|
| 208,581 A | * | 10/1878 | Falvey | A01K 85/16 43/42.26 |
| 1,247,955 A | * | 11/1917 | Grube | A01K 85/16 43/42.26 |
| 1,792,366 A | * | 2/1931 | Ettles | A01K 85/18 43/42.26 |
| 1,813,722 A | * | 7/1931 | Wright | A01K 85/16 43/42.26 |
| 1,976,695 A | * | 10/1934 | Boehm | A01K 85/16 43/42.26 |
| 2,025,270 A | * | 12/1935 | Chaney | A01K 85/16 43/42.15 |
| 2,089,605 A | * | 8/1937 | Hardy | A01K 85/16 43/42.26 |
| 2,215,772 A | * | 9/1940 | Vecchia | A01K 85/16 43/42.34 |

(Continued)

FOREIGN PATENT DOCUMENTS

| | | | | |
|---|---|---|---|---|
| WO | WO 2004008847 A1 | 1/2004 | ............. | A01K 85/18 |

OTHER PUBLICATIONS

D77 Deep Teeny Wee-Crawfish crankbait, online catalog page (1 sheet), www.lurenet.com/productdetail.aspx?id=4912 (accessed online Mar. 23, 2010).

Flex Crawfish artificial lure, online catalog page (1 sheet), www.strikeprolures.com/index.php?main_page=product_info&cPath=2_4&products_id=12 (accessed online Mar. 23, 2010).

(Continued)

*Primary Examiner* — Darren W Ark
(74) *Attorney, Agent, or Firm* — Jonathan A. Bay

(57) ABSTRACT

An imitation crawdad artificial fishing lure has a jointed hard body with a weighted hard abdomen articulated to a buoyant hard cephalothorax. A pair of soft pincers are interchangeably connected to the cephalothorax, which pincers can be swapped with others for changing pincer styles. A single one fishhook is interchangeably connected to the cephalothorax, which fishhook can be swapped with others for changing between heavier and lighter gauge fishhooks, or for sharper fresh fishhooks. Preferably the cephalothorax has simulated hard pincer stalks for alternatively holding the soft pincers in a swimming position or else flaring the pincers out into a guard position. Soft walking legs might be interchangeably connected to the cephalothorax as well.

12 Claims, 17 Drawing Sheets

(56) References Cited

U.S. PATENT DOCUMENTS

| | | | | |
|---|---|---|---|---|
| 2,218,280 A * | 10/1940 | Deering | A01K 85/16 | 43/42.26 |
| 2,334,792 A | 11/1943 | Royston | | 43/42.15 |
| 2,582,646 A * | 1/1952 | Moore | A01K 83/06 | 43/44.2 |
| 2,597,792 A * | 5/1952 | Hardy | A01K 85/18 | 43/42.15 |
| 2,611,205 A | 9/1952 | Steel | | 43/42.3 |
| 2,663,964 A * | 12/1953 | Martin | A01K 85/18 | 43/42.15 |
| 2,718,668 A * | 9/1955 | Burke | A01K 85/00 | 43/42.24 |
| 2,724,205 A * | 11/1955 | Howard | A01K 85/16 | 43/42.26 |
| 2,754,613 A * | 7/1956 | Rogers | A01K 83/06 | 43/44.6 |
| 2,770,063 A * | 11/1956 | Martin | A01K 85/16 | 43/42.26 |
| 2,787,076 A * | 4/1957 | Kring | A01K 85/16 | 43/42.16 |
| 2,791,859 A * | 5/1957 | Wentworth | A01K 85/16 | 43/42.02 |
| 2,793,460 A * | 5/1957 | Mutchler | A01K 85/16 | 43/42.26 |
| 2,819,553 A * | 1/1958 | Fultz | A01K 85/16 | 43/42.26 |
| 2,869,278 A * | 1/1959 | Cook | A01K 97/24 | 43/42.08 |
| 2,910,799 A * | 11/1959 | Wentworth | A01K 85/16 | 43/42.15 |
| 3,006,104 A * | 10/1961 | Allen | A01K 85/18 | 43/42.15 |
| 3,105,317 A * | 10/1963 | Fox | A01K 85/01 | 43/42.26 |
| 3,172,227 A | 3/1965 | Mackey | | 43/42.15 |
| 3,377,734 A * | 4/1968 | Snow | A01K 85/24 | 43/42.24 |
| 3,389,490 A * | 6/1968 | Peters | A01K 85/16 | 43/42.26 |
| 3,438,144 A * | 4/1969 | Lincoln | A01K 85/18 | 43/42.15 |
| 3,863,383 A * | 2/1975 | Lore | A01K 83/06 | 43/44.6 |
| 3,867,781 A | 2/1975 | Wolfe | | 43/42.09 |
| 3,979,853 A * | 9/1976 | Storm | A01K 85/16 | 43/42.09 |
| 4,367,607 A | 1/1983 | Hedman | | 43/42.1 |
| 4,516,352 A * | 5/1985 | Firmin | A01K 85/16 | 43/42.26 |
| 4,567,685 A * | 2/1986 | Duncan | A01K 85/18 | 43/42.15 |
| 4,573,282 A | 3/1986 | Rowe | | 43/42.15 |
| 4,771,567 A * | 9/1988 | Cannon | A01K 85/00 | 43/42.26 |
| 4,796,376 A * | 1/1989 | Schlaegel | A01K 85/16 | 43/44.6 |
| 4,858,367 A * | 8/1989 | Rabideau | A01K 85/00 | 43/42.28 |
| 4,910,907 A * | 3/1990 | Schlaegel | A01K 83/06 | 43/44.6 |
| 5,042,189 A | 8/1991 | Bailey | | 43/42.09 |
| 5,094,026 A | 3/1992 | Correll et al. | | 43/42.15 |
| 5,228,230 A * | 7/1993 | Vaught | A01K 85/00 | 43/42.26 |
| 5,367,817 A * | 11/1994 | Clark | A01K 85/00 | 43/42.24 |
| 5,379,544 A | 1/1995 | Davidson | | 43/42.39 |
| 5,406,738 A | 4/1995 | Holleman, Sr. | | 43/42.15 |
| 5,438,790 A * | 8/1995 | Rigney | A01K 85/00 | 43/42.24 |
| 5,491,927 A | 2/1996 | Ortiz | | 43/42.28 |
| 5,522,170 A | 6/1996 | Cole | | 43/42.15 |
| 5,524,377 A | 6/1996 | Freeman et al. | | 43/42.3 |
| 5,551,185 A | 9/1996 | Reed | | 43/42.09 |
| 5,611,168 A * | 3/1997 | Schultz | A01K 83/06 | 43/44.6 |
| 5,625,975 A | 5/1997 | Imes | | 43/42.09 |
| 5,630,289 A * | 5/1997 | Dotson | A01K 85/00 | 43/42.09 |
| 5,673,508 A * | 10/1997 | Snyder | A01K 85/00 | 43/44.8 |
| 5,787,634 A * | 8/1998 | Way | A01K 85/18 | 43/42.15 |
| 5,822,913 A | 10/1998 | Lau | | 43/42.37 |
| 5,829,183 A * | 11/1998 | Guerin | A01K 85/18 | 43/42.15 |
| 5,829,186 A * | 11/1998 | Schultz | A01K 83/06 | 43/44.6 |
| 5,875,582 A | 3/1999 | Ratzlaff et al. | | 43/26.1 |
| 5,911,571 A | 6/1999 | Wittbrot, III | | 43/42.15 |
| 5,915,944 A * | 6/1999 | Strunk | A01K 85/00 | 43/42.26 |
| 5,946,848 A | 9/1999 | Ysteboe et al. | | 43/42.15 |
| 5,992,083 A | 11/1999 | Deng et al. | | 43/42.15 |
| 6,032,400 A * | 3/2000 | Lau | A01K 85/00 | 43/42.26 |
| 6,052,938 A | 4/2000 | Marusak et al. | | 43/42.09 |
| 6,058,643 A | 5/2000 | Marusak et al. | | 43/42.09 |
| 6,164,006 A | 12/2000 | Peterson | | 43/42.09 |
| 6,192,618 B1 | 2/2001 | Wackerman | | 43/42.15 |
| 6,212,818 B1 * | 4/2001 | Huddleston | A01K 85/00 | 43/42.09 |
| 6,226,918 B1 | 5/2001 | Rigney | | 43/42.24 |
| 6,233,863 B1 | 5/2001 | Dotson | | 43/42.09 |
| 6,240,672 B1 | 6/2001 | Huppert | | 43/42.37 |
| 6,393,755 B1 | 5/2002 | Weaver | | 43/42.03 |
| 6,405,477 B1 * | 6/2002 | Huppert | A01K 83/06 | 43/42.24 |
| 6,505,432 B2 * | 1/2003 | Brinkman | A01K 83/06 | 43/42 |
| 6,546,663 B1 * | 4/2003 | Signitzer | A01K 85/00 | 43/42.26 |
| 6,658,785 B1 | 12/2003 | Faulkner et al. | | 43/44.2 |
| 6,865,842 B2 * | 3/2005 | Brinkman | A01K 85/00 | 43/42.02 |
| 6,895,710 B2 * | 5/2005 | Hanson | A01K 85/00 | 43/44.6 |
| 6,912,808 B1 * | 7/2005 | Mak | A01K 85/16 | 43/42.15 |
| 7,114,285 B1 * | 10/2006 | Ince | A01K 85/00 | 43/42.09 |
| 7,263,798 B2 | 9/2007 | Nichols | | 43/42.09 |
| 7,272,910 B2 | 9/2007 | Mell | | 43/42.09 |
| 7,493,725 B2 * | 2/2009 | Sampson | A01K 85/16 | 43/42.3 |
| 7,497,045 B1 | 3/2009 | Crowe et al. | | 43/42.39 |
| 7,621,068 B1 | 11/2009 | Renosky | | 43/42.15 |
| 7,895,789 B2 * | 3/2011 | Langer | A01K 85/00 | 43/42.09 |
| 7,971,387 B2 * | 7/2011 | Huddleston | A01K 85/00 | 43/44.2 |
| 8,230,639 B2 | 7/2012 | Langer et al. | | 43/42.15 |
| 8,635,804 B2 | 1/2014 | Lefebre | | 43/42.39 |
| 8,640,378 B2 | 2/2014 | Rye et al. | | |
| 8,646,203 B2 * | 2/2014 | Pennaz | A01K 85/18 | 43/42.15 |
| 8,793,924 B2 * | 8/2014 | Hughes | A01K 85/18 | 43/42.15 |
| 9,253,966 B2 * | 2/2016 | Scholfield | A01K 85/01 | |
| 2001/0047609 A1 | 12/2001 | Orgeron et al. | | 43/42.31 |
| 2002/0073599 A1 * | 6/2002 | Brinkman | A01K 85/00 | 43/4.5 |
| 2005/0044772 A1 * | 3/2005 | Lillard | A01K 83/06 | 43/44.6 |
| 2005/0172538 A1 * | 8/2005 | Brinkman | A01K 85/00 | 43/42.36 |
| 2005/0193620 A1 * | 9/2005 | King | A01K 85/00 | 43/42.26 |
| 2007/0144054 A1 * | 6/2007 | Warczok | A01K 85/00 | 43/42.24 |
| 2008/0148623 A1 | 6/2008 | Uhrig | | 43/42.39 |
| 2008/0289243 A1 | 11/2008 | Huddleston | | 43/42.4 |

(56) References Cited

U.S. PATENT DOCUMENTS

| | | | |
|---|---|---|---|
| 2009/0126256 A1* | 5/2009 | Gregory | A01K 85/12 43/42.09 |
| 2009/0183418 A1 | 7/2009 | Dahlberg | 43/42.3 |
| 2010/0024277 A1 | 2/2010 | Ross | 43/42.09 |
| 2010/0236129 A1* | 9/2010 | Rigney | A01K 85/16 43/42.26 |
| 2012/0102815 A1 | 5/2012 | Hughes | 43/42.15 |
| 2013/0180159 A1* | 7/2013 | Smith | A01K 85/02 43/42.22 |
| 2014/0250763 A1* | 9/2014 | Hrncir | A01K 85/18 43/42.15 |
| 2015/0264903 A1* | 9/2015 | Korteweg | A01K 85/00 43/42.06 |

OTHER PUBLICATIONS

Chatter Shrimp® artificial lure, online catalog page (1 sheet), zmanfishing.com/store/categories/chatterbait/chattershrimp (accessed online Mar. 23, 2010).

Chatter Shad ® artificial lure, online catalog page (1 sheet), zmanfishing.com/store/categories/chatterbait/chattershad (accessed online Mar. 23, 2010).

Meat and Potatoes Crankbaits, online brochure (3 sheets), (covered by U.S. Pat. No. 7,114,285—Ince) www.meatandpotatoes.net/HotBackFTR.htm (accessed online Mar. 23, 2010).

River2Sea Crawler crankbait, online catalog page (2 sheets), www.river2seausa.com/t/crawler.html (accessed online Mar. 23, 2010).

* cited by examiner

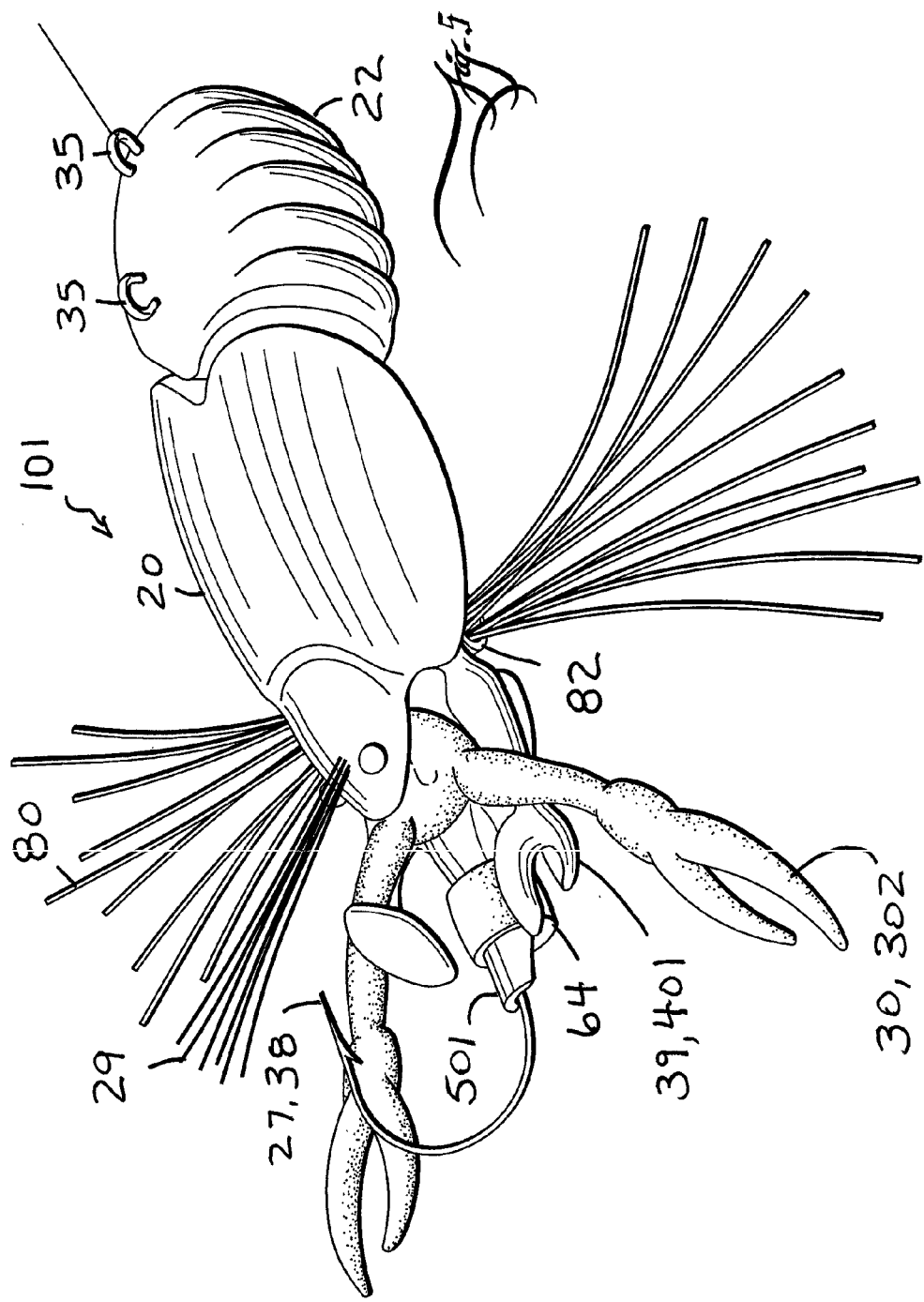

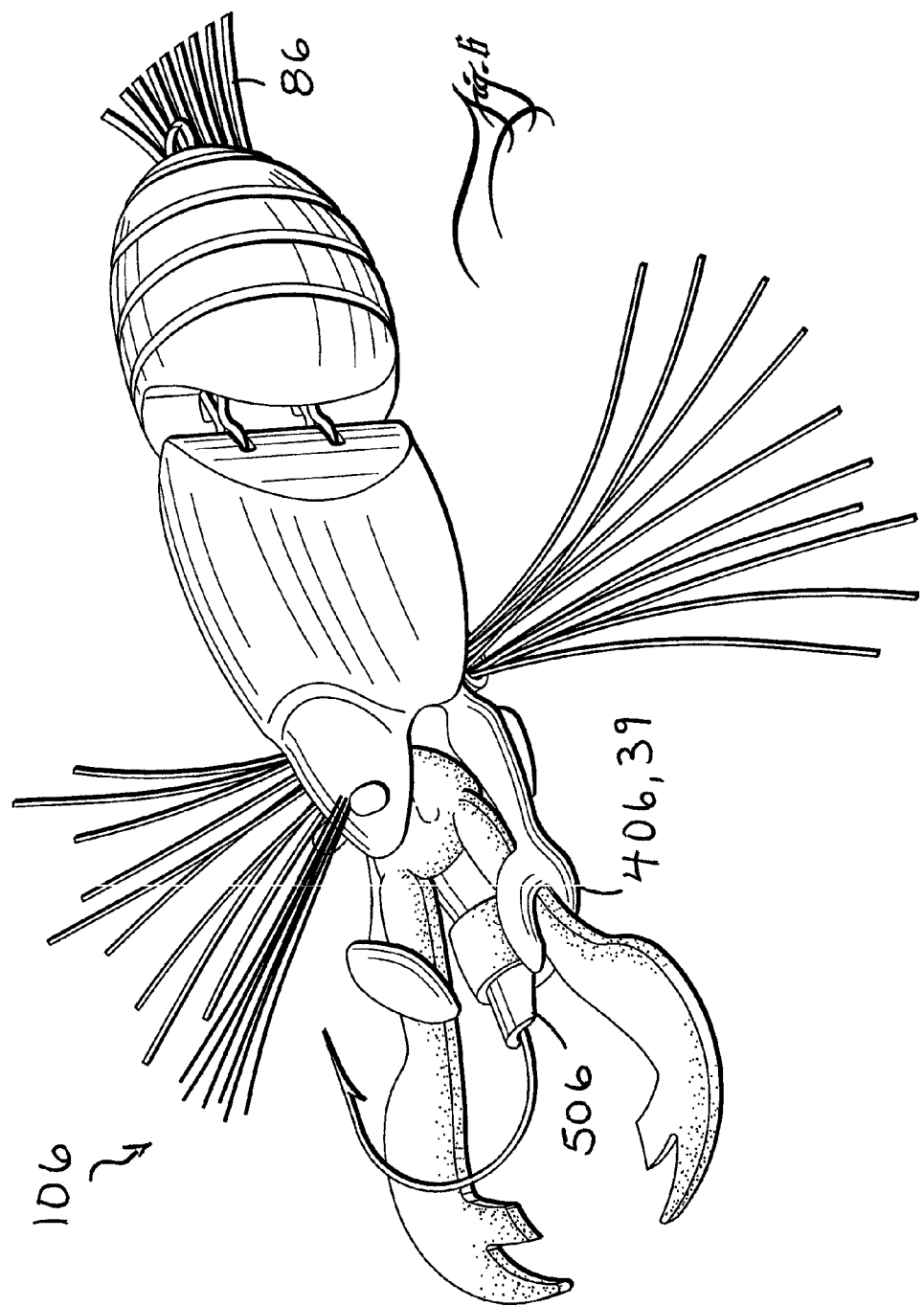

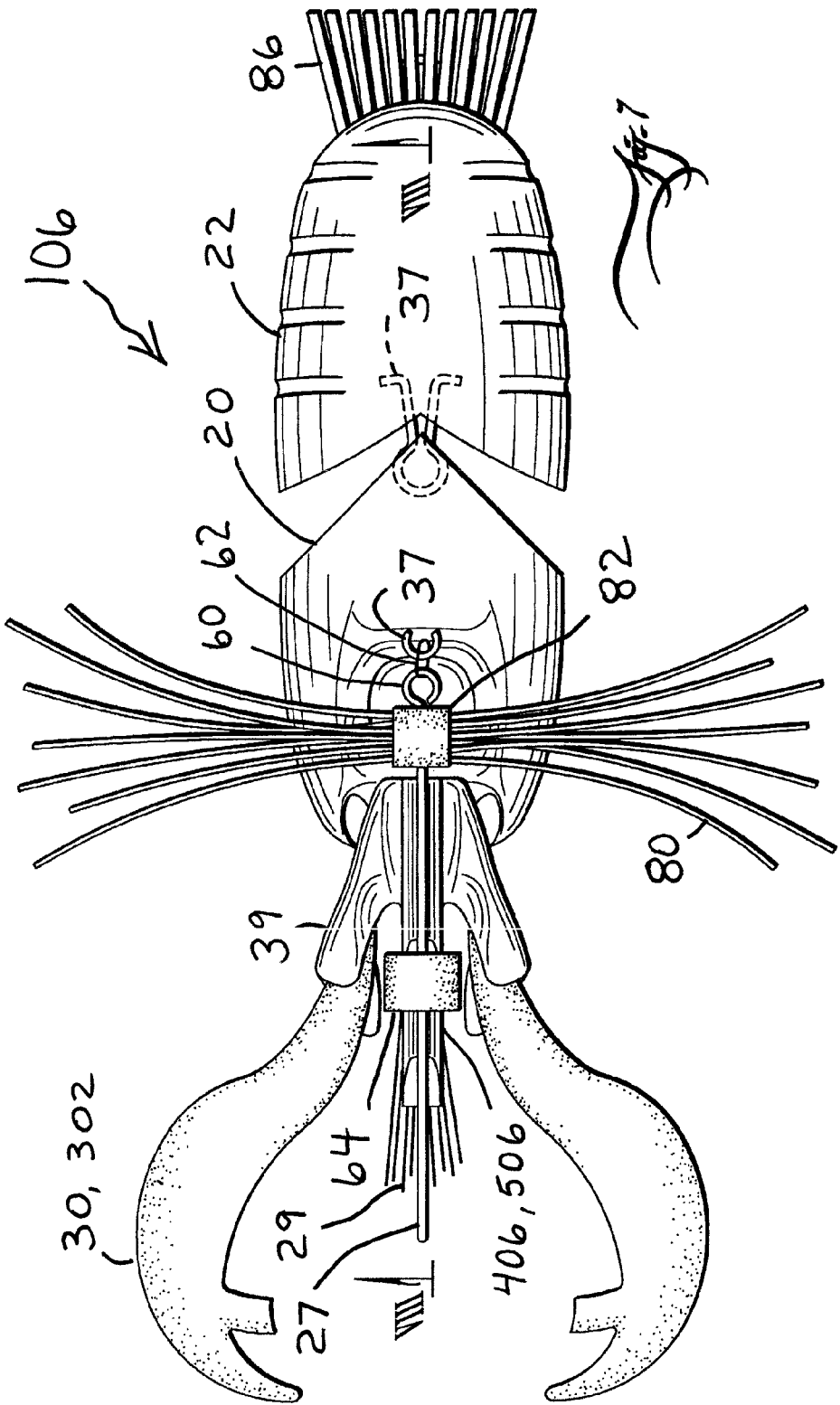

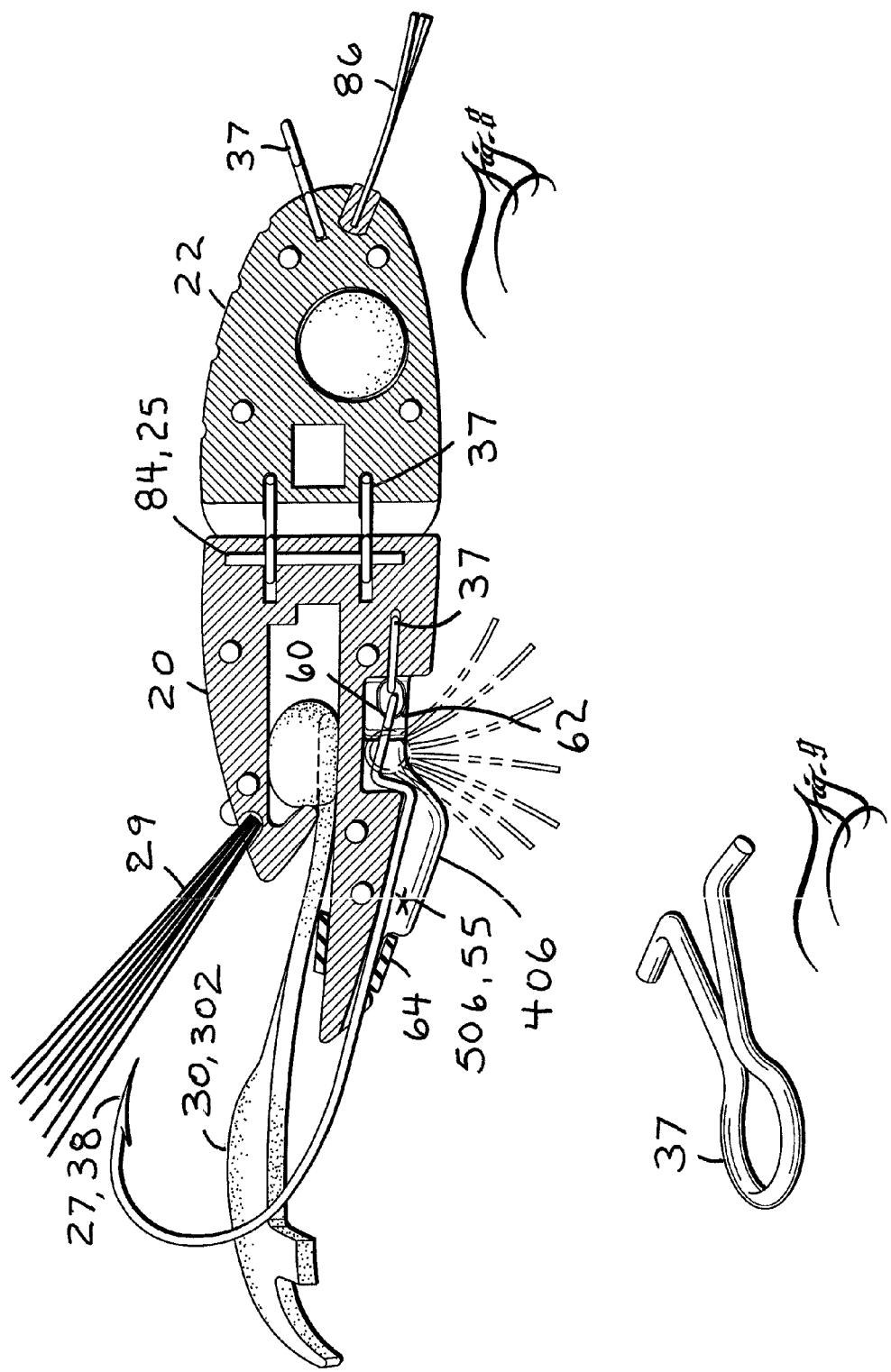

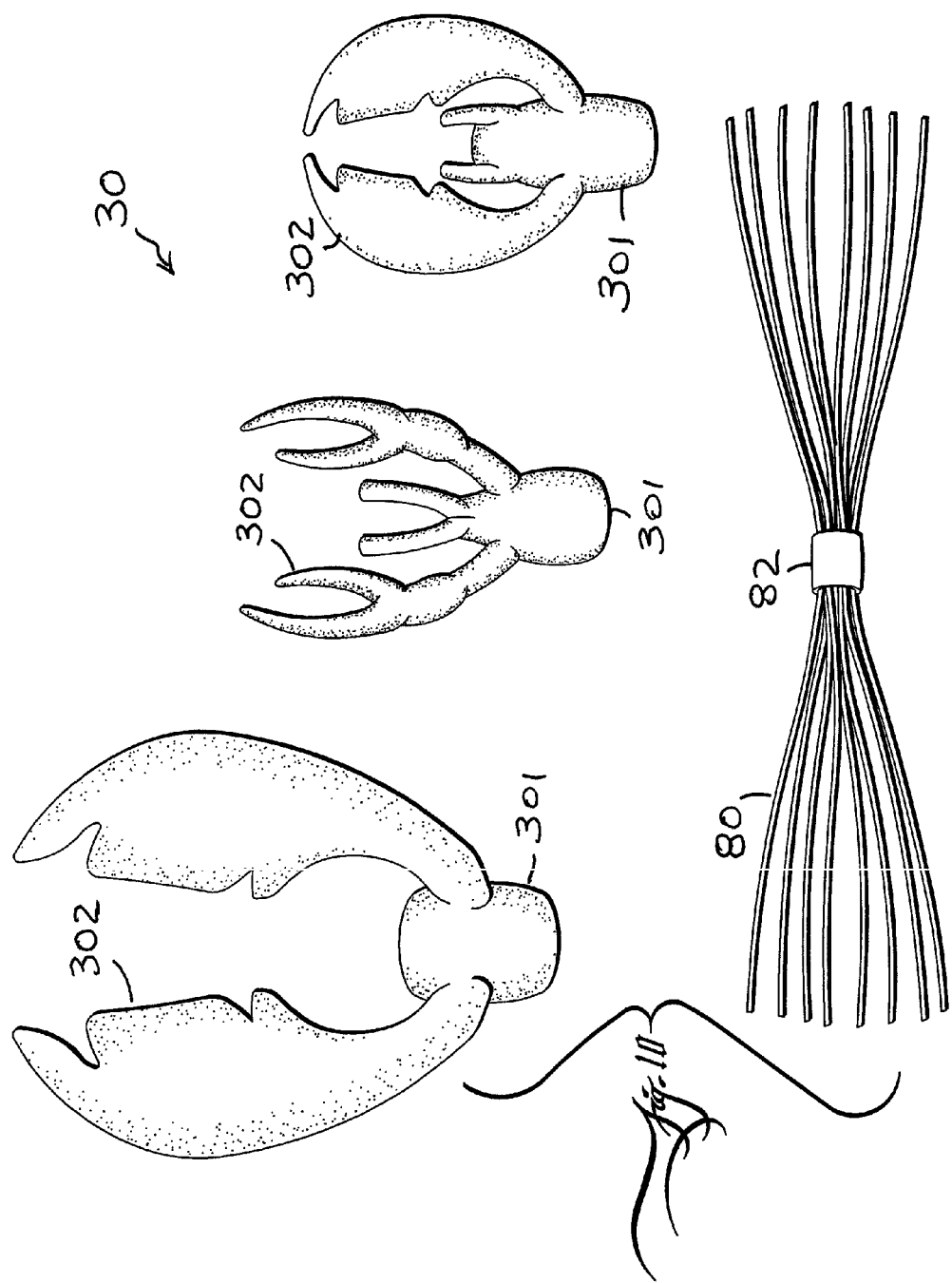

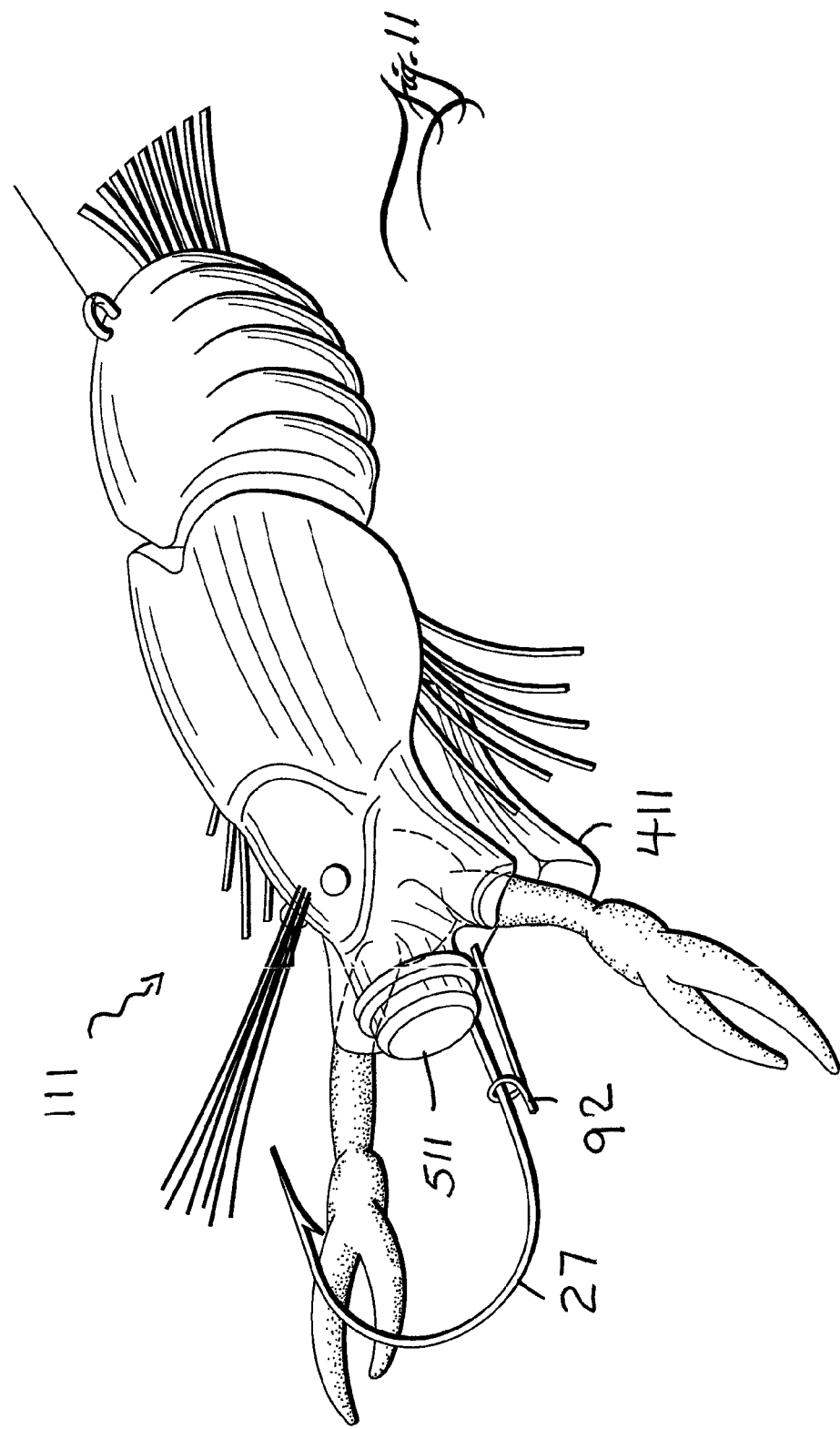

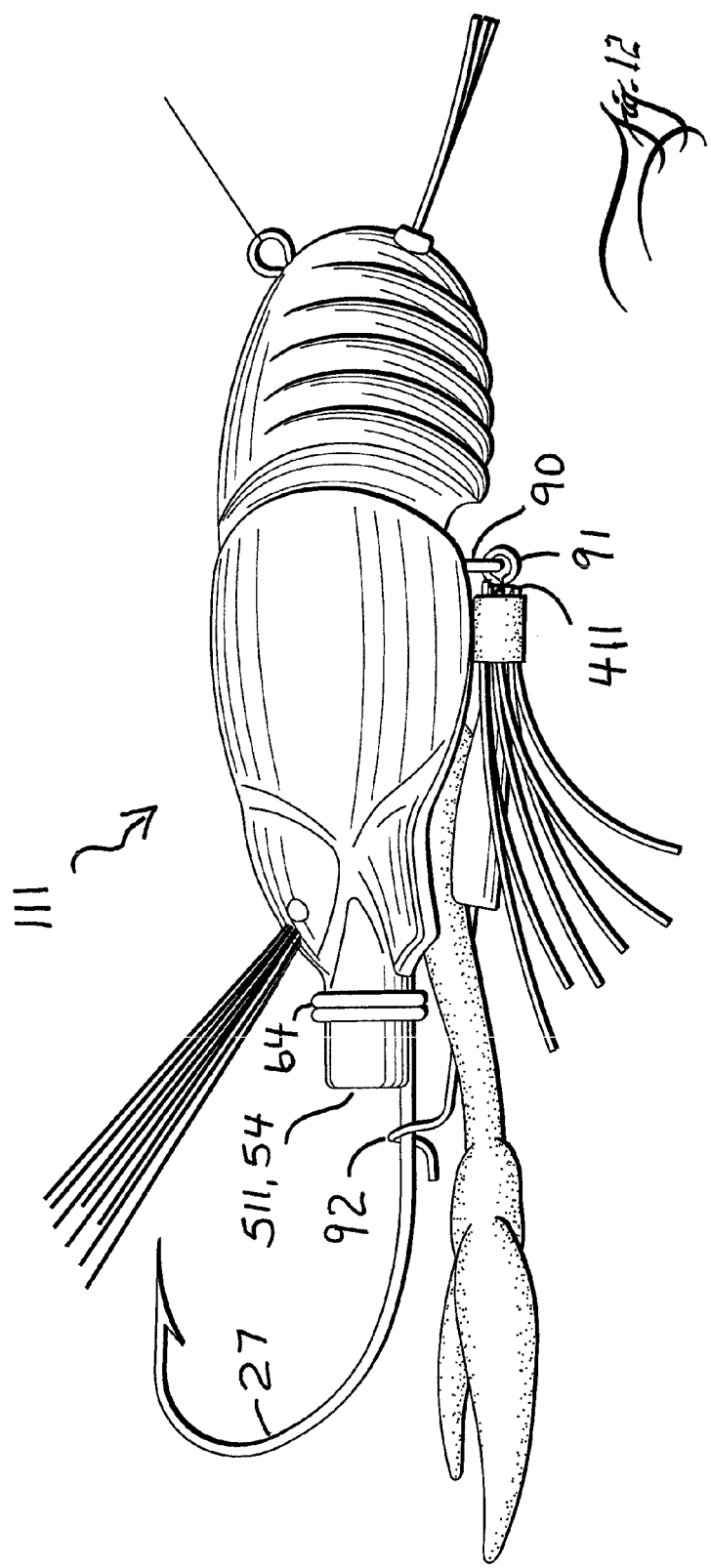

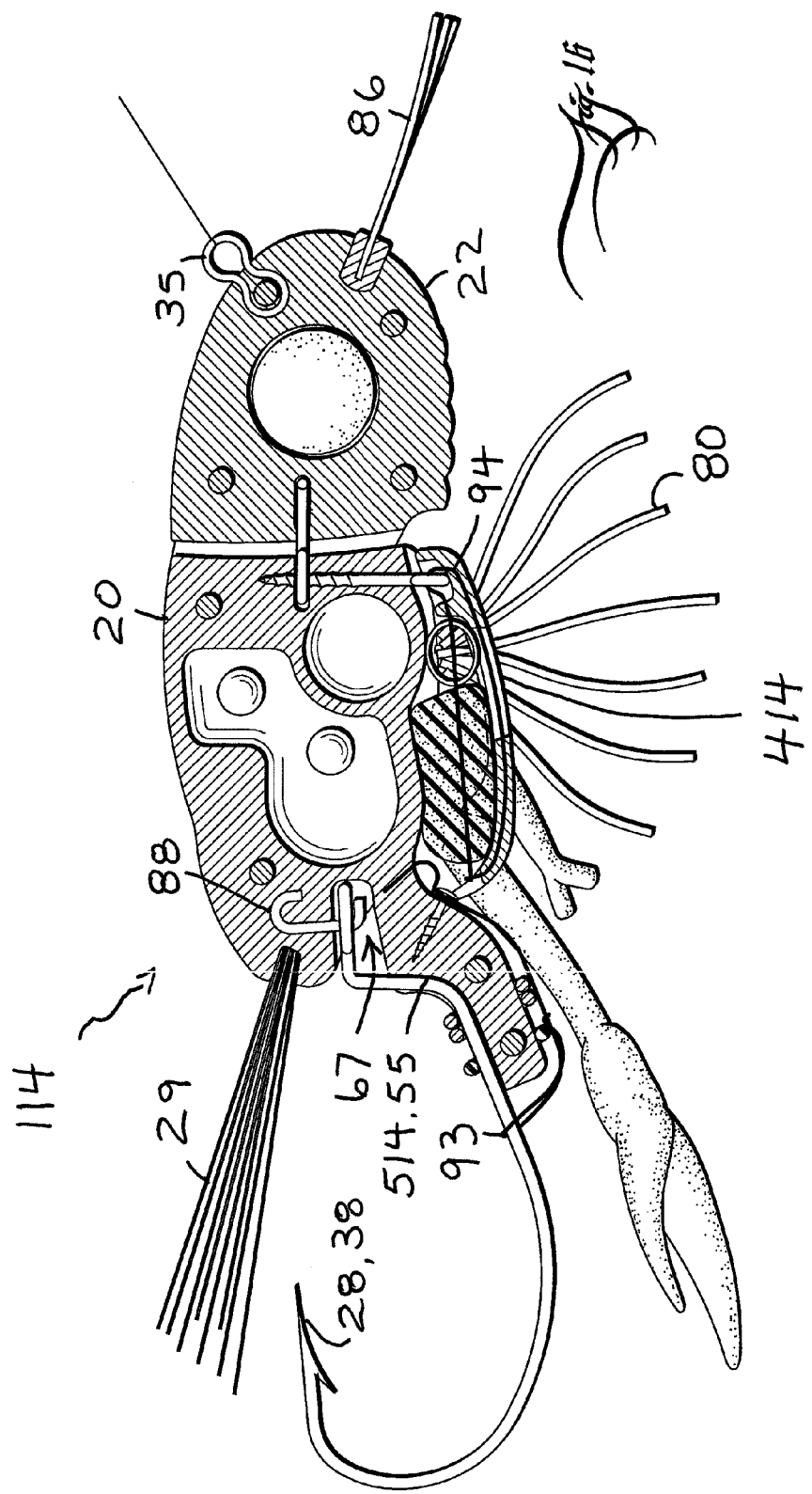

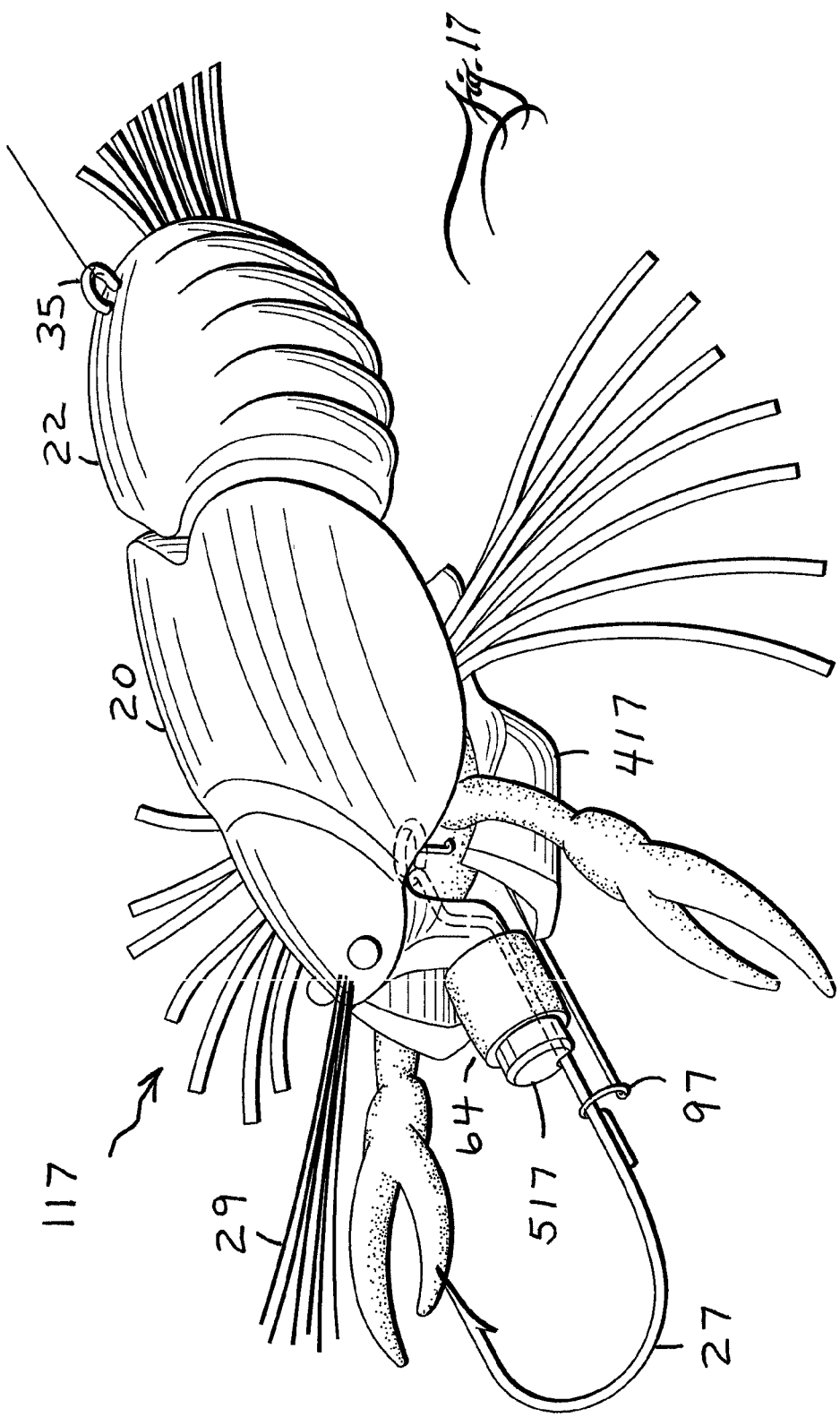

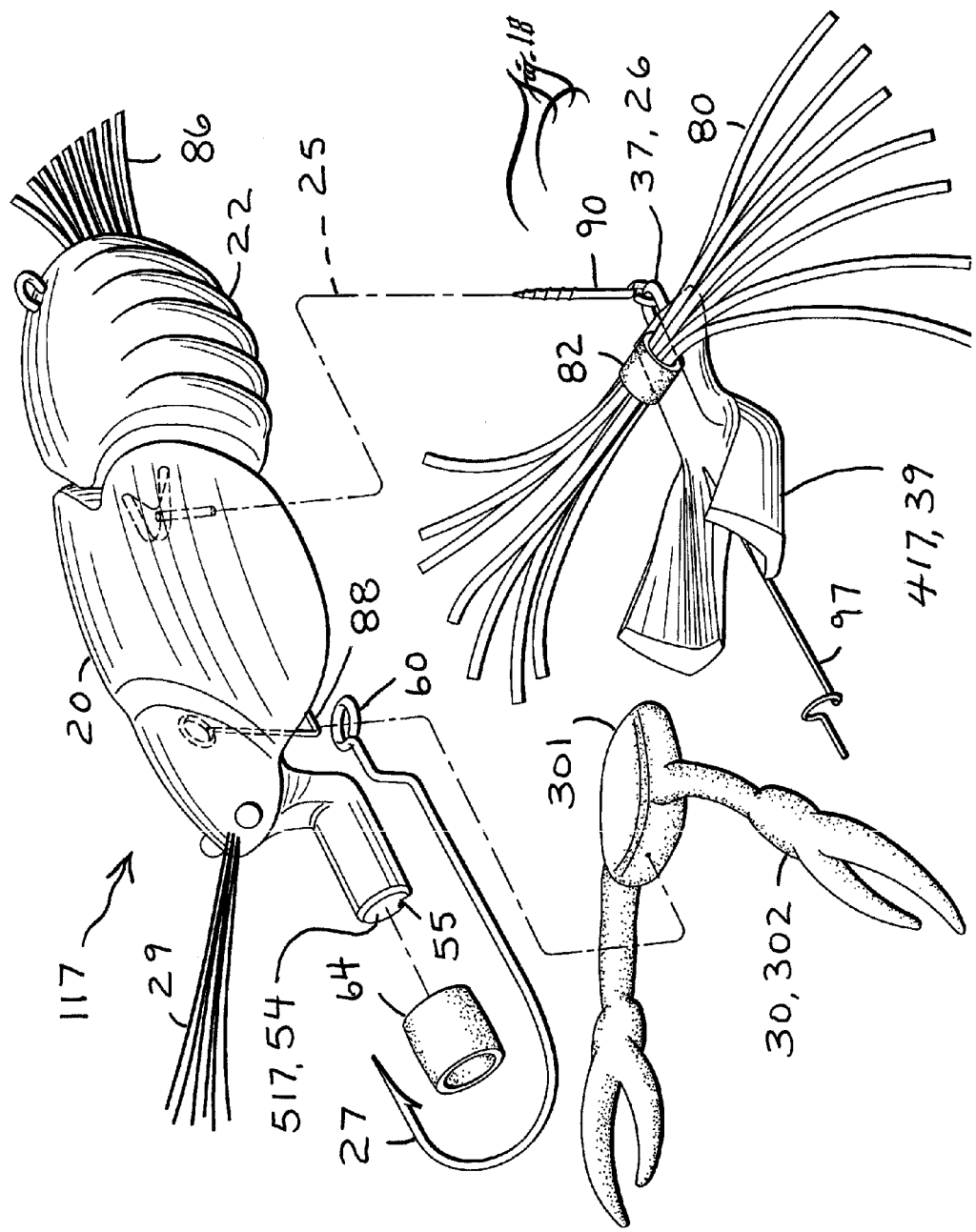

IMITATION CRAWDAD ARTIFICIAL FISHING LURE

CROSS-REFERENCE TO PROVISIONAL APPLICATION(S)

This application is a divisional of U.S. patent application Ser. No. 13/199,048, filed Aug. 17, 2011, which is a continuation-in-part of U.S. patent application Ser. No. 13/066,846, filed Apr. 26, 2011, now abandoned, which claims the benefit of U.S. Provisional Application No. 61/404,626, filed Oct. 6, 2010 and U.S. Provisional Application No. 61/343,290, filed Apr. 26, 2010. All the foregoing patent disclosures are fully incorporated herein by reference.

BACKGROUND AND SUMMARY OF THE INVENTION

The invention relates to artificial fishing lures and, more particularly, to an imitation crawdad artificial fishing lure.

In this written description, various parts or portions of the lure are given what correspond to the technical names of the anatomy of true crayfish. A brief glossary comprises the following.

- Cephalothorax—the combined head and thorax (crayfish have no neck) and contains the heart, gills, and stomach.
- Carapace—the protective shell covering of the cephalothorax.
- Rostrum—the portion of the carapace projecting forward like hard eyelids.
- Abdomen—is popularly but incorrectly called a 'tail,' when in actuality, the abdomen is the segmented anatomy that contracts in tight crunches to propel the crawdad backwards. The abdomen terminates in two anatomies (telson and uropod) that are informally referred to as a tail fan.

Conversely, this written description in other parts gives fanciful names to the anatomy of the imitation crawdad. One example includes without limitation 'shoulder girdle.' Another example includes 'pincer stalks.' Shoulder girdle and pincer stalks are phrases adopted here for convenience in this description and are technically accurate. Technically speaking, pincer stalks would be the body-attached segments of the front two pereiopods, which are armed with the large claws or 'pincers' (the other four pair of pereiopods are primarily walking legs but are also used for gathering food).

A number of additional features and objects will be apparent in connection with the following discussion of the preferred embodiments and examples with reference to the drawings.

BRIEF DESCRIPTION OF THE DRAWINGS

There are shown in the drawings certain exemplary embodiments of the invention as presently preferred. It should be understood that the invention is not limited to the embodiments disclosed as examples, and is capable of variation within the scope of the skills of a person having ordinary skill in the art to which the invention pertains. In the drawings.

FIG. 5 is a perspective view comparable to FIG. 1 except showing an alternate disposition for the soft plastic pincers;

FIG. 6 is a perspective view of an alternate embodiment of an imitation crawdad artificial fishing lure in accordance with the invention;

FIG. 7 is a bottom plan view thereof;

FIG. 8 is an elevational section view taken along line VIII-VIII in FIG. 7;

FIG. 9 is an enlarged-scale perspective view of one of a plurality of anchoring ties in accordance with the invention;

FIG. 10 is a top plan view of accessories for the imitation crawdad artificial fishing lure in accordance with the invention, including a silicone material skirt simulative of crawdad legs and a variety of soft plastic pincers in accordance with the invention;

FIG. 11 is a perspective view of another embodiment of an imitation crawdad artificial fishing lure in accordance with the invention;

FIG. 12 is a side elevational view thereof;

FIG. 16 is an elevational section view taken on line XVI-XVI in FIG. 14;

FIG. 17 is a perspective view of a further embodiment of an imitation crawdad artificial fishing lure in accordance with the invention; and FIG. 18 is an exploded perspective view thereof.

DETAILED DESCRIPTION OF THE PREFERRED EMBODIMENTS

Figure 1:
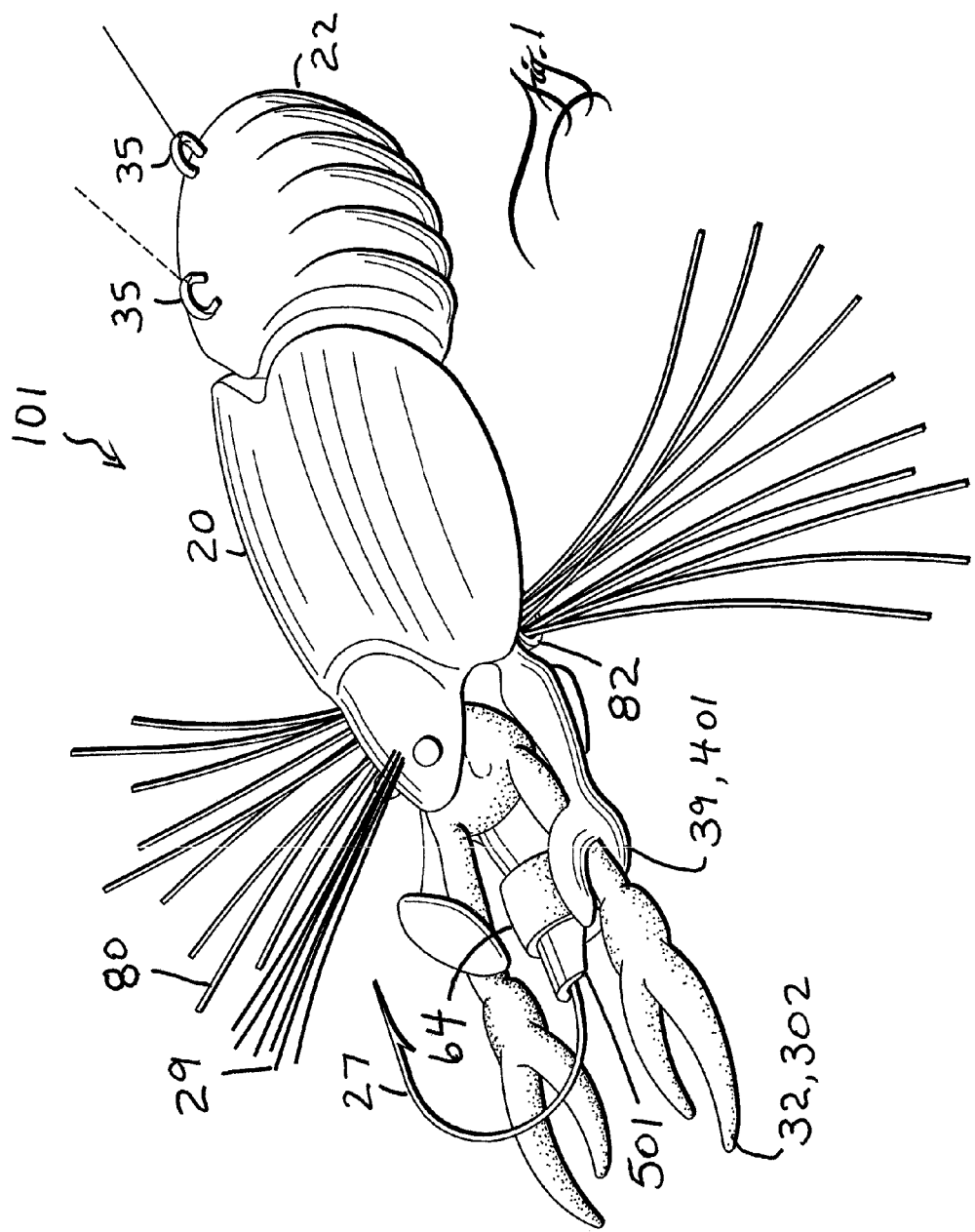
FIG. 1 is a perspective view of an imitation crawdad artificial fishing lure in accordance with the invention.

FIGS. 1-5 show an imitation crawdad artificial fishing lure 101 in accordance with the invention. Preferably the lure 101 comprises some of the following design matters:—

- a hard-bodied (eg., preferably hard-bodied) cephalothorax 20,
- a hard-bodied (again, preferably hard-bodied) abdomen 22,
- an articulated connection 24 between the cephalothorax 20 and abdomen 22,
- a single fishhook 27 which, despite being held in a fixed disposition, is replaceable,
- a weed/snag guard 29 to protect the single fishhook 27 from snagging, and
- a pair of soft plastic pincers 30 which, like the fishhook 27, are replaceable.

The hard-bodied cephalothorax 20 and abdomen 22 are preferably cast or molded from materials such as and without limitation plastic materials. Preferably the connection between the cephalothorax 20 and abdomen 22 is an articulated connection 24. In the drawings, the articulation 24 is shown by a non-limiting example to be executed as a pivot connection about a single axis. In FIGS. 1-5, the pivot connection 24 is shown to pivot about a horizontal axis. Preferably, the cephalothorax 20 is formed with air cells 32 to make it buoyant while the abdomen 22 is loaded with a sinking weigh 34 to make the lure 101 as a whole sink. When the abdomen 22 sinks to the bottom, the cephalothorax 20 buoys up and sways up-and-down relative to the abdomen 22.

Conversely, the articulation 25 between the cephalothorax 20 and abdomen 22 for the embodiments of FIGS. 6, 11, 14 and 17 is shown to be about a vertical axis. Such a vertical axis pivot connection 25 provides for lateral left-to-right motion between the cephalothorax 20 and abdomen 22. The left-to-right swaying is intended to simulate a crayfish which, while in a pincers-flared fighting position, moves about a little bit to protect itself from different directions.

The abdomen 22 has two line ties 35 for attaching the lure 101 to an angler's fishing line, a forward line tie 35 and a rearward line tie 35. The forward line tie 35 allows the lure 101 to be more readily jigged vertically. By either line tie 35, the lure 101 is fished through the water predominantly in reverse, with the abdomen 22 leading, and the head trailing. The fishhook 27 trails behind the head, with the barbed point 38 riding up.

Figure 2:
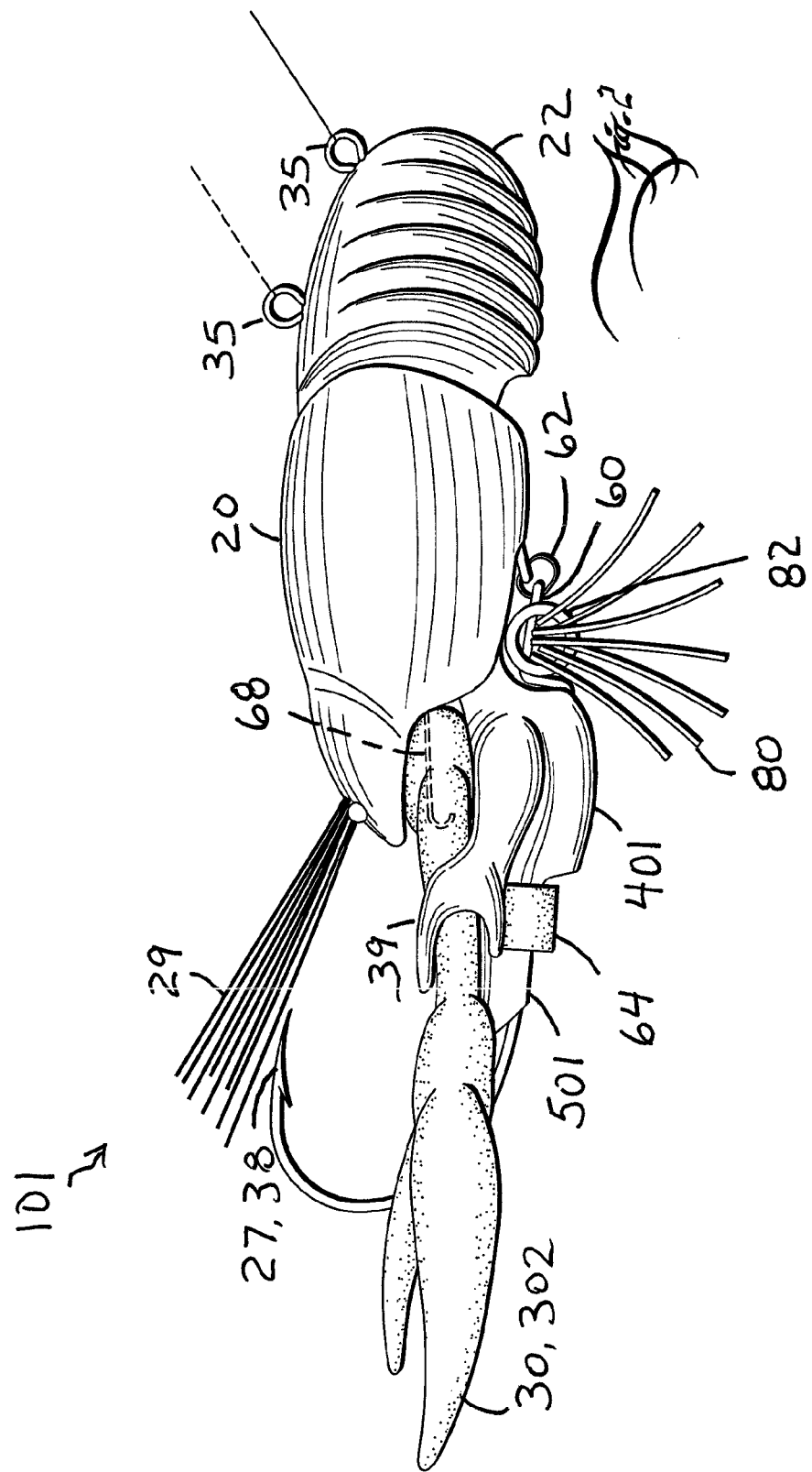
FIG. 2 is a side elevational view thereof.
Figure 4:
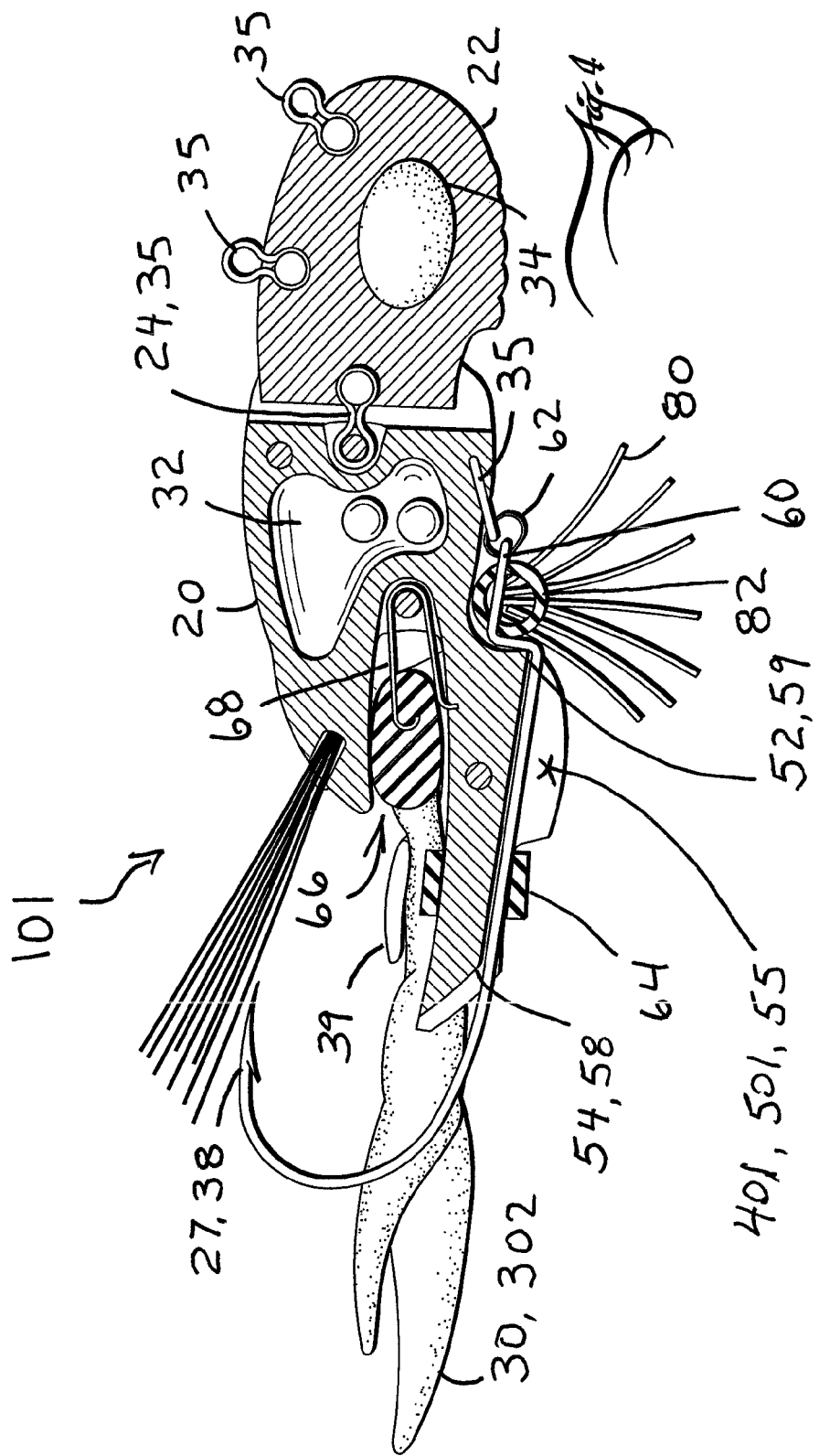
FIG. 4 is an elevational section view taken along line IV-IV in FIG. 3.

In FIGS. 2 and 4, the cephalothorax 20 has the weed/snag guard 29 projecting out of the forehead and spaced above the barbed point 38. The fishhook 27 is retained in the cephalothorax 20 to ride in a fixed and rigid position, with the barbed point 38 up and tucked underneath the weed/snag guard 29.

It is an aspect of the invention to equip the lure 101 with just a single fixed fishhook 27. A single fishhook 27 can be more readily protected by a weed/snag guard 29 than treble hooks.

It is another aspect of the invention that the fishhook 27 is interchangeable and/or replaceable. Nowadays, fishhooks fresh from the factory are incredibly sharp. However, the lure 101 in accordance with the invention is intended to be fished in punishing cover. This includes not only timber but also rock and boulders as well. It is a natural consequence of fishing in such punishing cover that the fishhook 27 point 38 will eventually get dulled. Manual re-sharpening of a dulled point is never likely to return the point to as sharp as it was when new. Accordingly, it is an aspect of the invention to simply allow replacement of a dulled fishhook for a factory-fresh sharp fishhook.

Figure 3:
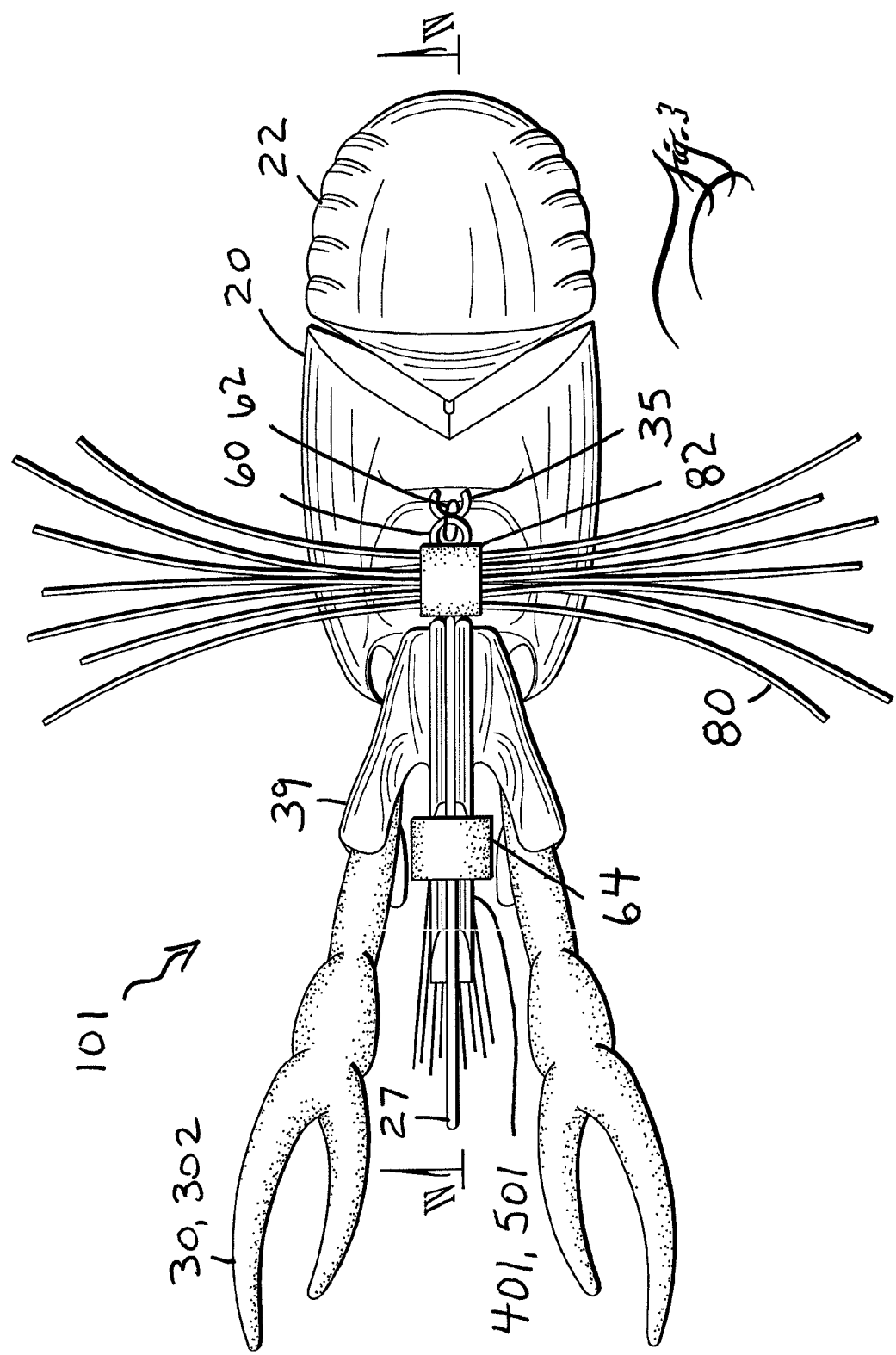
FIG. 3 is a bottom plan view thereof.

As FIG. 3 shows, the cephalothorax 20 has a bottom front formation to it that forms a trident-shaped shoulder girdle 401. That is, this shoulder girdle 401 not only has two pincer stalks 39 but also has a middle spar 501. As FIG. 4 shows better, the spar 501 serves to stabilize the fishhook 27 in a fixed and rigid disposition. The spar 501 extends between a base end 52 and a tip end 54. The spar 501 has an axial groove 55 in the bottom of it. The axial groove 55 extends between spaced open ends 58 and 59. That is, the axial groove 55 in the spar 501 extends between a front end 58 opened through the spar 501's tip end 54 and a rear end 59 opened through the spar 501's base end 52.

The cephalothorax 20 has an anchoring tie 35 sunk in the hard-body. The anchoring tie 35 is disposed in sort of the gullet of the cephalothorax 20. The anchoring tie 35 has a figure-8 shape to it, as do the line ties 35. Half of the figure-8 shape is sunk in the hard body 20, and the other half of the figure-8 shape is exposed, offering itself as the exposed portion of the anchoring tie 35. The eye 60 of the fishhook 27 is removably connected to the anchoring tie 35 by a ring fastener 62, such as and without limitation a split ring.

This fishhook 27 has a style of shank known as an offset shank. Among fishhooks, there are styles with straight shanks and styles with curved shanks, and then there are styles with offsets, keels, bends etc. For example, FIG. 4 shows an offset straight shank fishhook. (The industry technically calls this style a standard straight shank offset.) For comparison's sake, FIG. 16 shows an offset curved shank fishhook 28. (The industry technically calls this style a wide gap curved shank offset.)

It is an aspect of the invention to utilize a fishhook having a shank with an offset or other curve, keel, kink or bend back formation. That way, the cephalothorax 20 and spar 501 in accordance with the invention can more firmly hold the barbed point 38 in a rigid and fixed position underneath the weed/snag guard 29. Otherwise, the fishhook might rotate, exposing the barbed point 38 to one side or the other of the weed/snag guard 29, making the lure 101 more vulnerable to snagging and loss.

Given the foregoing, the offset portion of the fishhook 27's shank lies just outside the rear end 59 of the axial groove 55, just about against the base end 52 of the spar 501. The straight portion of the shank beyond the offset is cradled inside the axial groove 55 until the straight portion of the shank projects out beyond the tip end 54 of the spar 501.

One or more retention provisions 64 are slipped over both the spar 501 of the shoulder girdle 401 and the fishhook 27's shank. In FIGS. 3 and 4, such retention provisions 64 comprise for example and without limitation miniature rubber bands. This keeps the fishhook 27's shank from displacing out of the axial groove 55. Again, it is an aspect of the invention to secure the fishhook 27 firmly in a fixed position, all the while allowing the fishhook 27 to be replaceable/interchangeable.

FIG. 4 shows best that the abdomen 22 is weighted with a sinking weight 34 while the cephalothorax 20 is provided with an air cell 32 for buoyancy. The lure 101 is generally denser than water, and hence sinks. It is preferred if the density for the artificial fishing lure 101 is highly unevenly distributed such that the abdomen 22 is densest, and the cephalothorax 20 is actually buoyant. The abdomen 22 is shown in this one non-limiting example of manner of construction to comprise two split halves which define a hollow cavity for receiving a sinking weight 34. In the form shown, the sinking weight 34 is a leaden eggshell sinker (eg., for use in states which still allow lead fishing sinkers).

In FIG. 4, the lure 101 is shown with four figure-8 shaped anchoring ties 35 sunk in the hard material of the hard bodies. The two figure-8 shaped anchoring ties 35 on the spine of the abdomen 22 serve as the previously-mentioned line ties 35. The forward figure-8 shaped anchoring tie 35 in the abdomen 22 forms one part of the pivot connection 24 to the cephalothorax 20. The lone figure-8 shaped anchoring tie 35 in the cephalothorax 20 (eg., approximately in the gullet region) serves as the anchoring tie 35 for the eye 60 of the fishhook 27.

One non-limiting example of manner of construction of the cephalothorax 20 and abdomen 22 is to make each body in two split halves and then join the halves together. Each body half of the cephalothorax 20 is recessed in with half of an air cell 32 for buoyancy. Each body half of the abdomen 22 is recessed in with half of a cavity for a sinking weight 34. The abdomen 22 sinks the lure 101 as a whole. Once the lure 101 lands on the bottom or on a submerged tree limb, the cephalothorax 20 will float up and raise the lure 101 on its abdomen 22. The air cell 32 is optionally filled with one or more beads to give the lure 101 a rattle sound.

FIGS. 1, 3 and 5 show better that the shoulder girdle 401 which includes the spar 501 furthermore includes the pair of pincer stalks 39. As FIG. 4 shows better, this cephalothorax 20 is formed with a recessed-in mouth 66 underneath the rostrum and above the shoulder girdle 401. The mouth 66 is more or less a cylindrical cavity. Centered on the center-line of the mouth 66 is an inverted-G shaped wire retainer 68. It is the retainer 68 for retaining the thorax 301 of a soft plastic pincer accessory 30, which is a trimmed version of an imitation soft plastic crawdad. The inverted-G shaped retainer has a tail formed in a half of a loop for impaling the soft plastic pincer accessory 30 and retaining it a shown.

FIG. 10 shows a variety of oft plastic pincer accessories 30 derived from soft plastic imitation crawdads. These accessories 30 can be used interchangeably. These accessories 30 are basically produced by taking a full soft plastic imitation crawdad and trimming them such that their imitation abdomen and tail fan are discarded. What remains are the imitation head, thorax 301 and pincers 302. Sometimes, the imitation head is trimmed and discarded as well, leaving behind just a thorax 301 and pincers 302. FIGS. 1-5 show better the insertion of one such soft plastic accessory 30 in the mouth 66 of the hard-bodied cephalothorax 20. FIG. 4 shows that the inverted-G shaped retainer 68 retains the soft plastic pincer accessory 30 by the tail thereof.

Contrasting FIG. 1 to FIG. 5 shows better the purpose of the pincer stalks 39 of the hard-bodied shoulder girdle 401. FIG. 5 shows the soft plastic pincers flared outside of the pincer stalks 39 of the hard-bodied shoulder girdle 401. In contrast, in FIGURE the soft plastic pincers are confined inside the pincer stalks 39 of the hard-bodied cephalothorax 20. FIG. 5 presents more of a fight simulation. FIG. 1 presents more of a flee simulation.

FIGS. 1-5 show a silicone material skirt 80, which could be used interchangeably with living rubber leas. FIGS. 3 and 4 show best that the silicone skirt 80 is secured to the lure by a short length of surgical tubing 82 that is pierced by the fishhook 27. The pierced tubing 82 is slid all the way up the shank of the fishhook 27 until above the offset and stopped by the eye 60. The silicone skirt 80 simulates the walking legs of this imitation crawdad artificial fishing lure 101 in accordance with the invention.

FIGS. 6-9 show an alternate embodiment of an imitation crawdad artificial fishing lure 106 in accordance with the invention. Like the FIGS. 1-5 embodiment, this artificial fishing lure 106 shown by FIGS. 6-9 has a single fishhook 27, which is replaceable for a fresh fishhook or interchangeable with a fishhook of a different size as desired. The lure 106 is weighted at the line tie end (which is the abdomen 22). A hard-bodied cephalothorax 20 is coupled to the hard-bodied abdomen 22 by a pivot connection 25. In this lure 106, the articulation 25 between the cephalothorax 20 and abdomen 22 is on a vertical axis as for left to right waggle (as viewed in FIG. 7).

The pivot connection 25 is formed by a pair of anchoring ties 37 in either the cephalothorax 20 or abdomen 22. As FIGS. 6-8 show, the anchoring ties 37 are sunk in the abdomen 22, and are aligned on a common vertical axis. As FIG. 9 shows better, the new shape for the anchoring ties 37 is no longer a figure-8 shape but more of an inverted-U shape 37. Again, about half of the anchoring tie 37 is sunk in solid material and the other half is exposed forming the exposed portion of the anchoring tie 37.

The pivot connection 25 further comprises a pivot pin 84 sunk in the cephalothorax 20. The pivot pin 84 extends through the two anchoring ties 37 which, as said, are aligned on a common vertical axis. The shank of the fishhook 27 is secured to the spar 506 of the shoulder girdle 406 by a retention provisions 64 comprising a miniature rubber band. The shoulder girdle 406 is not a separate piece from the cephalothorax but merely an extension thereof as shown in FIGS. 1-5.

Once again, the mouth 66 of the lure 106 forms an internal socket for insertion of a soft plastic pincer accessory 30 (or at least portions of an imitation crawdad, namely, the pincers flanking a thorax). The soft plastic pincer accessory 30 is interchangeable for different styles. The pincer stalks 39 are part of the hard-bodied cephalothorax 20 and either let the soft plastic pincers flare out in a fighting pose or else constrain them together in a swimming or fleeing pose. A silicone skirt 80 of the type commonly found on spinner baits or jigs is utilized to simulate the walking legs for this imitation crawdad artificial fishing lure 106.

The FIGS. 6-8 lure 106 has another distinction not shown in the FIGS. 1-5 lure 101 embodiment. This lure 106 has a bristle-material tail fan 86 sticking out of the abdomen 22 (ie., the tail fan 86 and abdomen 22 are not jointed). In actual use, the tail fan 86 functions somewhat as a bill or diving lip. A single line tie 37 is provided in about the rear center of the abdomen 22 (again, the retrieve of the lure 106 has it swimming backwards, so the rear end is the end which plows forward through the water).

Figure 13:
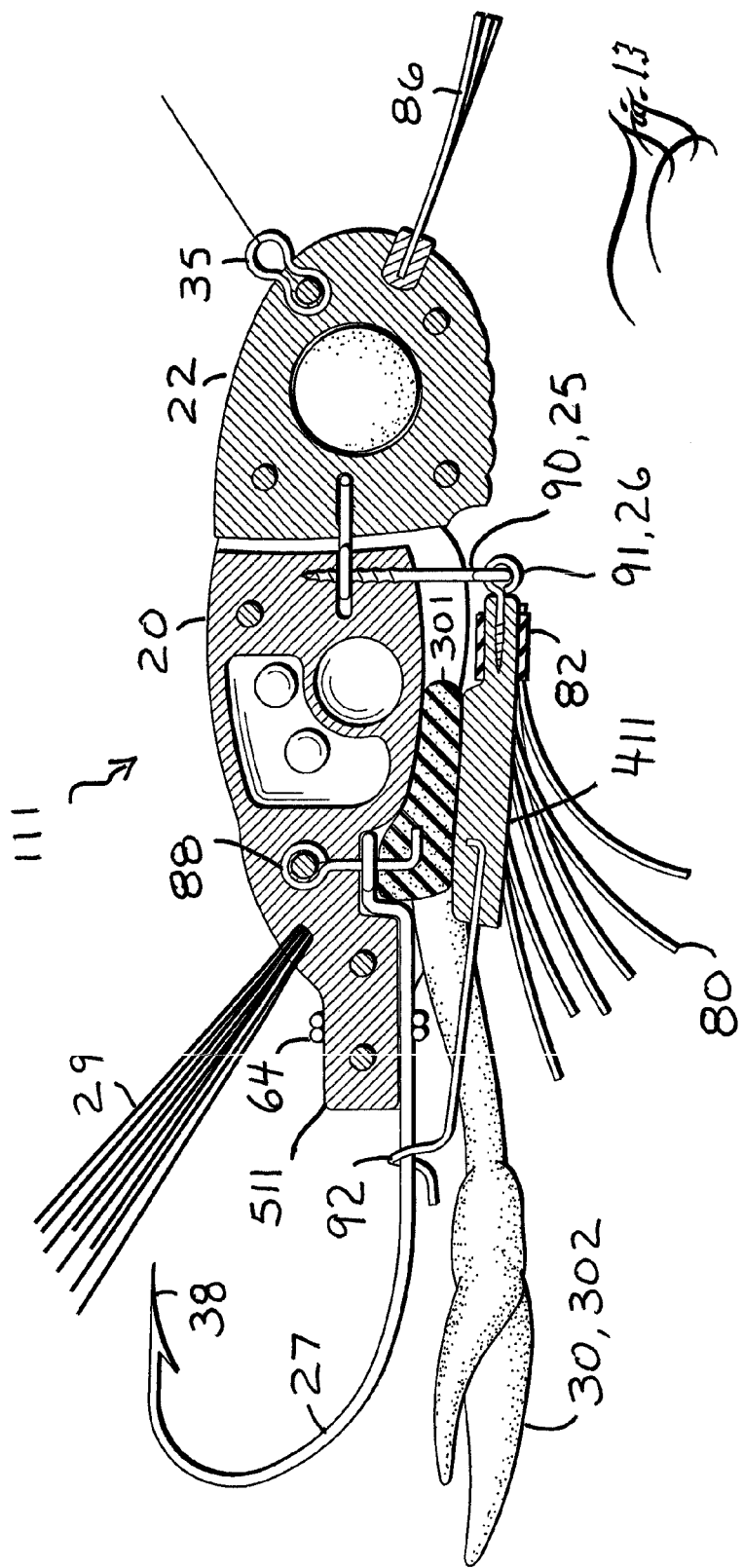
FIG. 13 is an elevational section view thereof through a vertical plane of lateral symmetry therefor.

FIGS. 11-13 show another embodiment of an imitation crawdad artificial fishing lure 111 in accordance with the invention. In the previous versions, the body had two articulated parts:—namely, the cephalothorax 20 and the abdomen 22. Here, the body has three articulated parts. That is, not only are the cephalothorax 20 and abdomen 22 articulated, but also cephalothorax 20 and the shoulder girdle 411.

FIG. 13 shows best that this lure 111 is distinguished by:—
  a hard-bodied shoulder girdle 411 articulated to the hard-bodied cephalothorax 20 for flap-like closure upon the soft plastic pincer accessory 30;
  the absence of permanently formed mouth,
  a spar 511 moved off the shoulder girdle 411 and extending from rostrum, and
  an abdomen 22 connected to the cephalothorax 20 by an articulated joint 25 which allows the abdomen 22 to be swapped for another that is weighted differently and therefor change the overall weight of the lure 111.

As shown, the spar 511 appears somewhat like a stubby snout. The weed/snag guard 29 projects out of the forehead, and up and over the spar 511. The spar 511 is formed with an axial groove 55 as described before, for cradling the shank of the offset shank fishhook 27. The shank is secured in the axial groove 55 of the spar 511 by a pair of retention provisions 64, which here comprise metal rings encircling the spar 511.

The spar 511 again extends between a tip end 54 and a base end 52. Sunk in the hard material of the cephalothorax 20 and spaced away from the base end 52 of the spar 511 is a g-shaped retainer wire 88. The g-shaped retainer 88 has a head sunk in the hard material of the cephalothorax and tail threaded through the eye 60 of the fishhook 27 and then impaled into the head or thorax 301 of the soft accessory. The metal rings 64 are slid onto the spar 511 to tighten the grip of the spar 511 and its axial groove 55 on the shank of the fishhook 27. Hence, the fishhook 27 is secured to the lure 111.

The pivot connection 25 between the abdomen 22 and cephalothorax 20 is formed between an anchoring tie 35 sunk in the abdomen 22 and the shaft of an eye-bolt 90 attaching the shoulder girdle 411 to the cephalothorax 20. The shoulder girdle 411 has a second eye-bolt 91 threaded into it. The interlinking of the eyes of the two eye-bolts 90 and 91 allows the shoulder girdle 411 to pivot relative to the cephalothorax 20.

As an aside, the articulation 25 between the cephalothorax 20 and abdomen 22 is always free to flap. That way, during a retrieve or even when sitting on the bottom, this freely flapping articulation 25 imparts a lifelike action to the lure 111. In contrast, the articulation 26 between the shoulder girdle 411 and the cephalothorax 20 is meant to be secured before a retrieve. It is not free to flap once secured.

The articulation 26 between the shoulder girdle 411 and cephalothorax 20 furthermore allows the shoulder girdle 411 to close, and clamp upon the soft plastic pincer accessory 30. The soft plastic pincer accessory 30 is held in part by being impaled by the tail of the g-shaped retainer 88 as shown. The soft plastic pincer accessory 30 is held in other part by the clamping of the shoulder girdle 411. The shoulder girdle 411 has a pigtailed latch retainer 92 extending out from it which latches with a half of a coil around the shank of the fishhook 27. Hence the shoulder girdle 411 slightly compresses the soft plastic pincer accessory 30. That way, the shoulder girdle 411 is under constant pressure to be forced open. But the pigtailed latch retainer 92 opposes the shoulder girdle 411 from opening, and the constant pressure on the pigtailed latch retainer 92 prevents it from un-latching once latched.

Given the foregoing, the articulated shoulder girdle 411 allows quicker change-out of the soft plastic pincer accessories as well as the fishhook 27.

Figure 14:
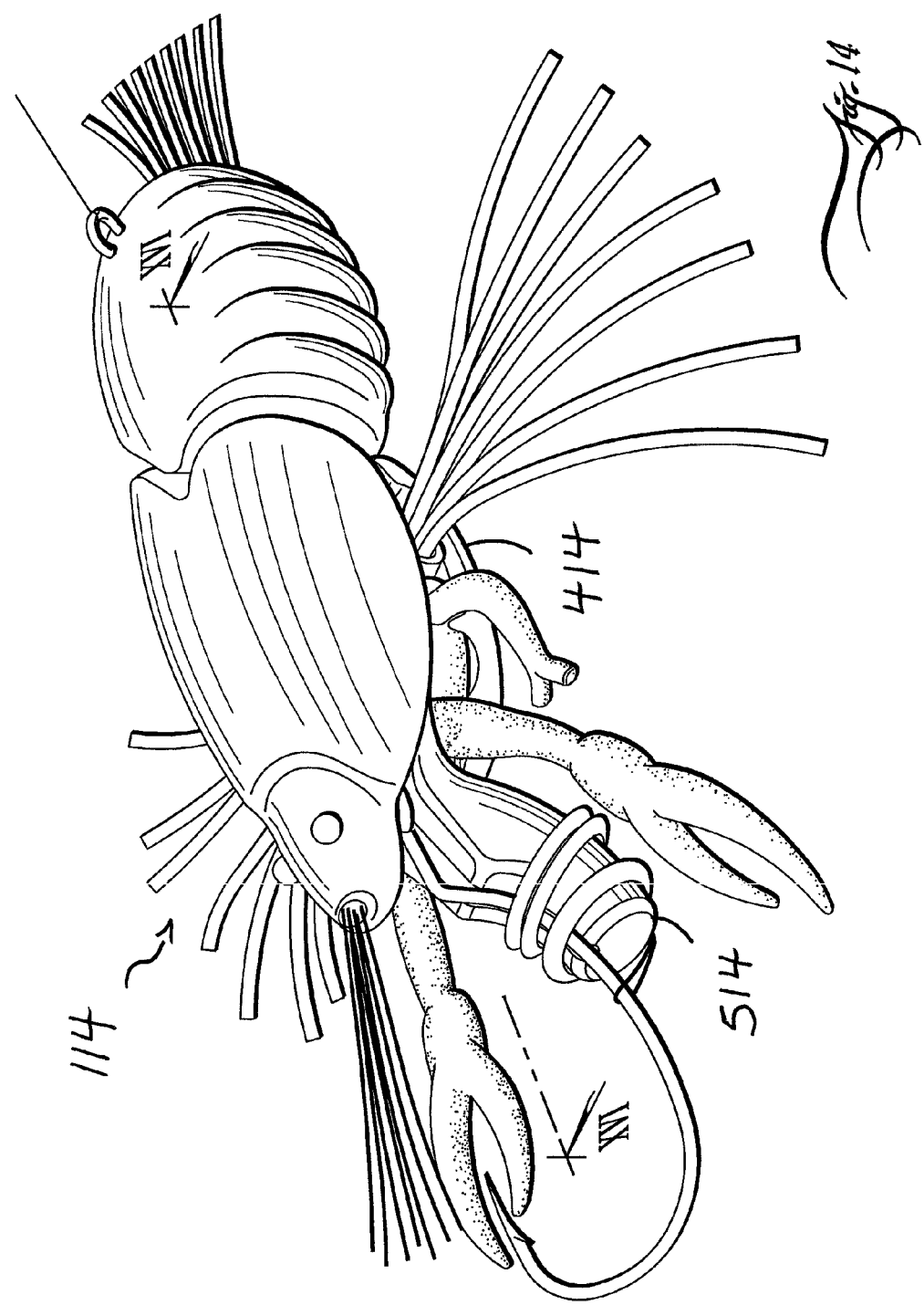
FIG. 14 is a perspective view of an additional embodiment of an imitation crawdad artificial fishing lure in accordance with the invention.
Figure 15:
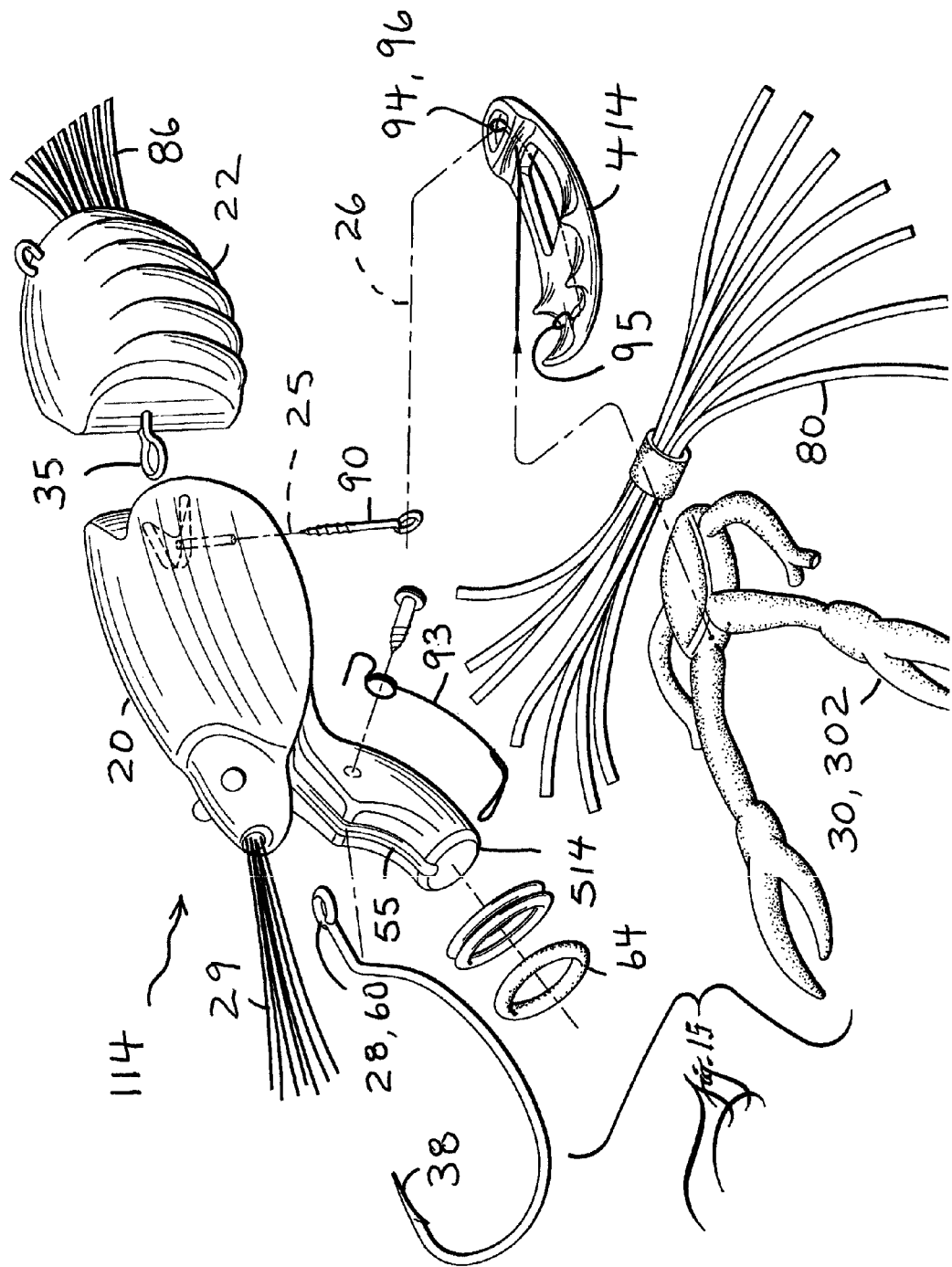
FIG. 15 is an exploded perspective view thereof.

FIGS. 14-16 show an additional embodiment of an imitation crawdad artificial fishing lure 114 in accordance with the invention. The differences here include the following.

This style of fishhook 28 is an offset curved shank fishhook 28. Accordingly, the spar 514 is curved. Also, the axial groove 55 is on top of the spar 514, not on the bottom. The rostrum is formed with a quasi-mouth 67 or cavity for the eye 60 of the fishhook 28 to extend into. The g-shaped wire retainer 88 is sunk into the roof of that cavity 67, and the tail dangles part way out for threading into the eye 60 of the fishhook 28. The shank is secured in the axial groove 55 of the spar 514 by retention provisions 64, which in this version comprise a pair of metal bands in combination with a miniature O-ring as well.

A pigtailed mounting tie 93 is formed out of wire and fastened to the spar 514 with a screw. The pigtailed projecting end of the pigtailed mounting tie 93 terminates in a half of a coil for latching around the shank of the fishhook 28. The pigtailed mounting tie 93 has an opposite end that forms a mounting tie portion 37. The shoulder girdle 414 is connected to the cephalothorax by an articulated connection 26 as in the FIG. 11 version, except with the following differences. Absent from the shoulder girdle 414 is the second of the two eye-bolts. The one eye-bolt 90 in the cephalothorax 20 remains, but the one in the shoulder girdle 414 is absent. The eye-bolt in the shoulder girdle 414 has been replaced by an elongated g-shaped retainer 94. The head 95 of the elongate g-shaped retainer 94 forms a loop that engages the eye of the eye-bolt 90 sunk in the cephalothorax 20. The tail 96 of the elongate g-shaped retainer 94 forms a half of a loop latches the mounting eye portion 37 of the pigtailed mounting tie 93. The resiliency of the soft plastic pincer accessory 30 keeps the pigtailed latching portion from readily un-latching.

FIGS. 17 and 18 show a further embodiment of an imitation crawdad artificial fishing lure 117 in accordance with the invention. The differences here include the following.

The spar 517 is once again formed for retaining the straight shank version of an offset shank fishhook 27. The axial groove 55 is formed again in the bottom of the spar 517. The retention provision 64 which encircles the spar 517 and fishhook 27 shank in this version comprises a short length of surgical tubing or, in the alternative, a copper band. The g-shaped retainer 88 which retains the eye 60 of the fishhook 27 once again does double duty by having its tail impaling the thorax 301 of the soft plastic pincer accessory 30, as shown in FIG. 13.

The elongated g-shaped retainer 94 for the articulated shoulder girdle 414 in FIG. 15 has been replaced by two separate pieces.

Here, the shoulder girdle 417 is outfitted with a pigtailed extension 97 formed of wire. The pigtailed portion of the pigtailed extension 97 forms a half of a coil which latches around the shank of the fishhook 27 as shown in FIG. 17. The second piece added here is an inverted-U shaped anchoring tie 37 sunk into the hard material of the shoulder girdle 417 and disposed to engage the eye of the eye-bolt 90 sunk into the cephalothorax 20.

Moreover, the articulated shoulder girdle 417 of FIGS. 17 and 18 is furthermore provided with pincer stalks 39. The description above where FIGS. 1 and 5 are contrasted to each other sufficiently describes the purpose of the pincer stalks 39. The soft plastic pincers can be confined inside the pincer stalks 39 as shown in FIG. 1 for a swimming/fleeing presentation, or flopped outside the pincer stalks 39 for a flaring/fighting presentation, as shown by FIGS. 5 and 18.

Among the other aspects of the invention, it is certainly a desirable aspect of the invention that changing the soft plastic pincer accessory 30 or the soft silicone legs does not require dis-assembling the fishhook 27 from the cephalothorax 20.

In addition, it is an aspect of the invention that the fishhook 27 can be replaced/exchanged without having to undo the fishing lure from the fishing line connection.

The invention having been disclosed in connection with the foregoing variations and examples, additional variations will now be apparent to persons skilled in the art. The invention is not intended to be limited to the variations specifically mentioned, and accordingly reference should be made to the appended claims rather than the foregoing discussion of preferred examples, to assess the scope of the invention in which exclusive rights are claimed.

I claim:

1. An imitation crawdad artificial fishing lure, comprising:
   a hard-bodied cephalothorax,
   a hard-bodied abdomen,
   an articulated connection between the cephalothorax and abdomen,
   a line-tie secured to the abdomen,
   at least one fishhook connected to the cephalothorax;
   said cephalothorax extending axially from said articulated connection with the abdomen to a trailing forehead portion,
   said cephalothorax formed with a cavity and a retention provision associated with the cavity;
   at least one pair of soft pincers meeting at a yoke and interchangeably attachable to the cephalothorax by virtue of the yoke being stuffed into the cavity until retained by the retention provision; and
   a fishhook retention device for removably retaining the at least one fishhook for replacement;
   wherein said at least one fishhook has a shank,
   said cephalothorax has a spar portion projecting rearwardly away at an elevation below the trailing forehead portion,
   said spar portion has an axial groove for cradling a portion of the shank of the at least one fishhook, and
   said fishhook retention device including a releasable retainer for retaining the at least one fishhook shank in the groove of the spar portion.

2. The imitation crawdad artificial fishing lure of claim 1 wherein:

said retainer comprises any of a miniature rubber band, a piece of surgical tubing, a metal band, an O-ring, and a metal ring.

3. The imitation crawdad artificial fishing lure of claim 1 wherein:
said at least one fishhook comprises a style of single-hook fishhooks further characterized by the shank being an offset shank.

4. The imitation crawdad artificial fishing lure of further claim 1 further comprising:
a hard-bodied flap articulated to the cephalothorax at an elevation below the trailing forehead portion and having open and shut positions, and
a releasable lock for locking said hard-bodied flap in the shut position.

5. The imitation crawdad artificial fishing lure of claim 4 further comprising:
said hard-bodied flap clamping on the at least one pair of soft pincers meeting at a yoke in the locked shut position such that the at least one pair of soft pincers trail behind the forehead portion.

6. The imitation crawdad artificial fishing lure of claim 5 wherein:
said hard-bodied flap further includes hard-bodied pincer stalks in a fixed position below the elevation of the forehead portion for forcing the at least one pair of soft pincers alternatively between one or the other of a close together, swim position or else a flaring, guard position.

7. The imitation crawdad artificial fishing lure of claim 4 further comprising:
a replaceable set of synthetic flexible simulated legs;
said hard-bodied flap providing a provision for replaceable retention of the replaceable set of synthetic flexible simulated legs in the locked shut position such that the legs generally flare in an elevation below the forehead portion.

8. The imitation crawdad artificial fishing lure of claim 1 wherein:
said at least one fishhook is retained by the fishhook retention device to ride in a fixed and rigid position, with a barbed point of the at least one fishhook up and spaced trailing behind the forehead portion.

9. The imitation crawdad artificial fishing lure of claim 1 wherein:
the articulated connection between the abdomen and cephalothorax is a pivot connection comprising an elongated pivot pin connected to one of the cephalothorax or abdomen and spaced rings connected to the other of the cephalothorax or abdomen such that the articulation between the cephalothorax or abdomen is on a consistent axis.

10. The imitation crawdad artificial fishing lure of claim 9 wherein:
the consistent axis for said pivot connection is vertical such that the cephalothorax and abdomen articulate relatively left and right with respect to each other.

11. The imitation crawdad artificial fishing lure of claim 1 further comprising:
a weed/snag guard projecting out of the forehead portion to protect the at least one fishhook from snagging.

12. An imitation crawdad artificial fishing lure, comprising:
a hard-bodied cephalothorax,
a hard-bodied abdomen,
an articulated connection between the cephalothorax and abdomen,
a line-tie secured to the abdomen,
at least one fishhook connected to the cephalothorax;
said cephalothorax extending axially from said articulated connection with the abdomen to a trailing forehead portion,
said cephalothorax formed with a cavity and a retention provision associated with the cavity; and
at least one pair of soft pincers meeting at a yoke and interchangeably attachable to the cephalothorax by virtue of the yoke being stuffed into the cavity until retained by the retention provision,
a hard-bodied flap articulated to the cephalothorax at an elevation below the trailing forehead portion and having open and shut positions, and
a releasable lock for locking said hard-bodied flap in the shut position;
wherein said at least one fishhook has a shank,
said releasable lock comprises a pigtailed latch retainer extending out from the hard-bodied flap for latching with a part of a coil thereof around the shank of the at least one fishhook.

* * * * *